United States Patent

Mahalanobis

[11] Patent Number: 5,947,413
[45] Date of Patent: Sep. 7, 1999

[54] CORRELATION FILTERS FOR TARGET REACQUISITION IN TRACKERS

[75] Inventor: Abhijit Mahalanobis, Tucson, Ariz.

[73] Assignee: Raytheon Company, Lexington, Mass.

[21] Appl. No.: 08/924,396

[22] Filed: Sep. 5, 1997

Related U.S. Application Data

[60] Provisional application No. 60/030,521, Nov. 12, 1996.

[51] Int. Cl.[6] ............................. F41G 7/00; G06K 9/00
[52] U.S. Cl. ..................... 244/3.17; 244/3.16; 382/103; 382/278
[58] Field of Search ................................. 244/3.16, 3.17; 382/278, 103; 701/223

[56] References Cited

U.S. PATENT DOCUMENTS

| | | | |
|---|---|---|---|
| 4,490,849 | 12/1984 | Grumet et al. | 244/3.17 |
| 4,739,401 | 4/1988 | Sacks et al. | 244/3.17 |
| 5,390,133 | 2/1995 | Sohie | 382/103 |
| 5,626,311 | 5/1997 | Smith et al. | 244/3.16 |
| 5,640,468 | 6/1997 | Hsu | 382/190 |

OTHER PUBLICATIONS

Mahalanobis, A., B.V.K.V. Kumar, S.Song, S.R.F.Sims, and J.F. Epperson, "Distance–classifier correlation filters for multiclass target recognition", Applied Optics, vol. 35. No. 17, pp. 3127–3133, Jun. 1996.

Mahalanobis, A., B.V.K.V.Kumar, and S.R.F.Sims, "Unconstrained correlation filters", Applied Optics, vol. 33, No. 17, pp. 3751–3759, Jun. 1994.

*Primary Examiner*—Charles T. Jordan
*Assistant Examiner*—Theresa M. Wesson
*Attorney, Agent, or Firm*—David W. Collins; Andrew J. Rudd; Glenn H. Lenzen, Jr.

[57] ABSTRACT

A system and method for target reacquisition and aimpoint selection in missile trackers. At the start of iterations through the process, distance classifier correlation filters (DCCFs) memorize the target's signature on the first frame. This stored target signature is used in a subsequent confidence match test, so the current sub-frame target registration will be compared against the stored target registration from the first frame. If the result of the match test is true, a patch of image centered on the aimpoint is used to synthesize the sub-frame filter. A sub-frame patch (containing the target) of the present frame is selected to find the target in the next frame. A next frame search provides the location and characteristics of a peak in the next image, which indicates the target position. The DCCP shape matching processing registers the sub-frame to the lock coordinates in the next frame. This process will track most frames, and operation will repeat. However, when the similarity measure criterion is not satisfied, maximum average correlation height (MACH) filters update the aim-point and re-designate the track-point. Once the MACH filters are invoked, the process re-initializes with the new lock coordinates. The MACH filters have pre-stored images which are independent of target and scene data being processed by the system.

5 Claims, 3 Drawing Sheets

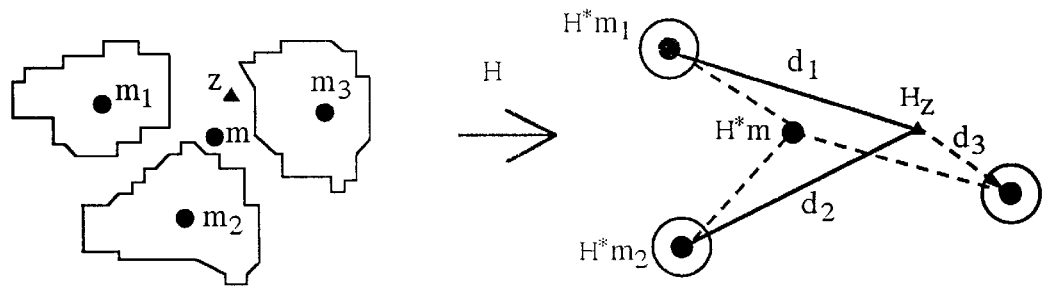
FIG. 1
FIG. 2
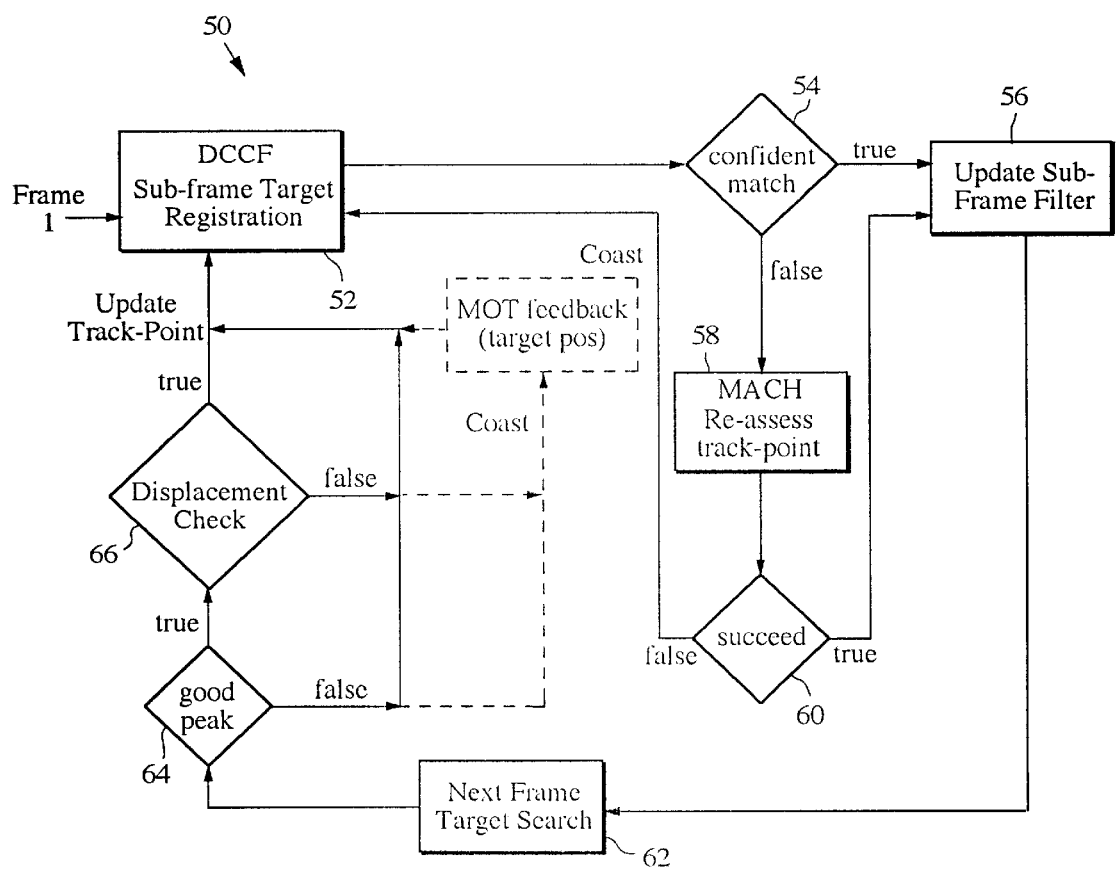

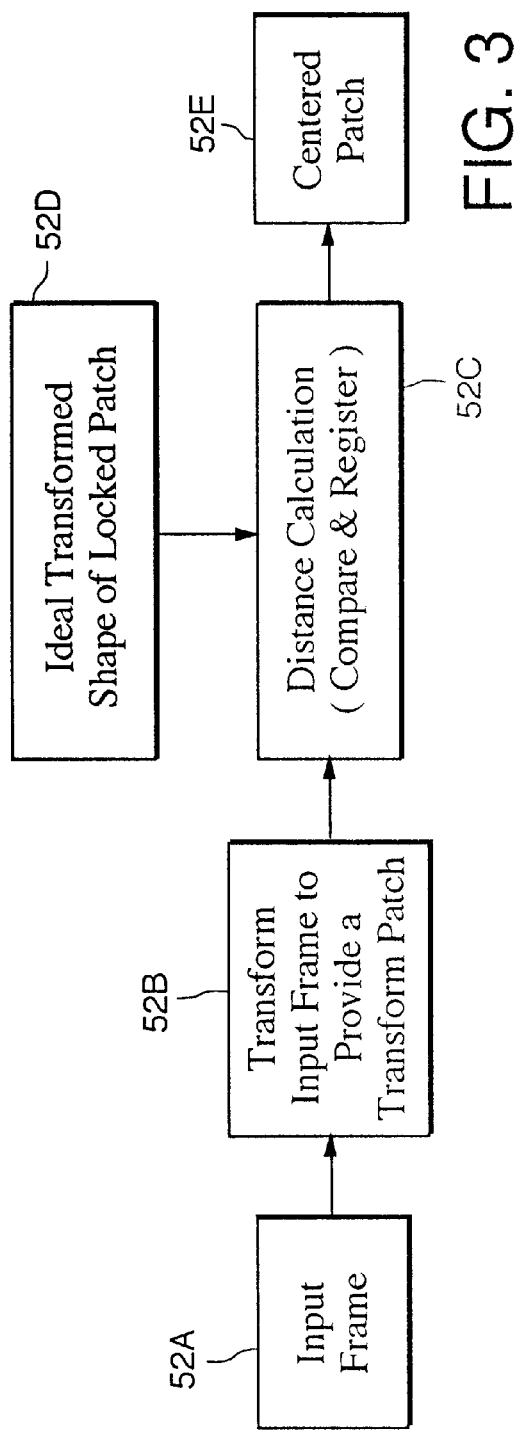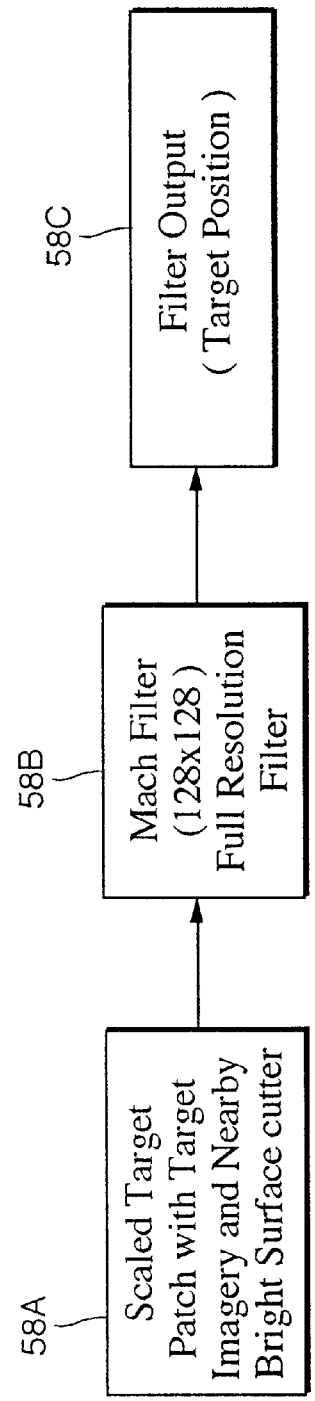

CORRELATION FILTERS FOR TARGET REACQUISITION IN TRACKERS

TECHNICAL FIELD OF THE INVENTION

This application claims priority from provisional application Ser. No. 60/030,521, docket No. PD-960430, filed Nov. 12, 1996.

This invention relates to trackers used in such application as airborne missiles, and more particularly to target reacquisition and aimpoint selection in such trackers.

BACKGROUND OF THE INVENTION

Correlation filters have been traditionally used for a variety of pattern matching problems including the recognition of mobile objects for automatic target recognition. The matched filter is perhaps the earliest and simplest of all correlation filters. A variety of design techniques have been proposed in the literature to extend this fundamental concept. B. V. K. Vijaya Kumar, "Tutorial survey of composite filter designs for optical correlators", Applied Optics, Vol. 31, pp. 4773–4801, (1992). A popular approach is to treat the filter as a composite of several samples of the pattern to be recognized (known as training images). Unconstrained Correlation Filters (UCFs), (see, A. Mahalanobis, B. V. K. Vijaya Kumar, and D. Casasent, "Minimum average correlation energy filters", Applied Optics, Vol. 26, pp. 3633–3640 (1987)), are the most recent development in composite filter design. These filters are derived to analytically optimize a suitable performance criterion. As the name indicates, a key difference between UCFs and their predecessors (known as synthetic discriminant filters or SDFS) is that no hard constraints are placed on the training data.

The early SDFs were designed to control only one point in the correlation plane. Unfortunately, this strategy seems inadequate because either large sidelobes make this controlled point difficult to find, or its value is significantly different from the desired value specified in the training process. It has been suggested that perhaps performance can be improved if all points in the correlation plane are somehow taken into account. Indeed, the minimum average correlation energy (MACE) filter (A. Mahalanobis, B. V. K. Vijaya Kumar, and D. Casasent, "Minimum average correlation energy filters", *Applied Optics,* Vol. 26, pp. 3633–3640 (1987)) affects the entire correlation plane by suppressing sidelobes everywhere. However, a more systematic development is needed to translate correlation plane control into improved discrimination and distortion tolerance.

The primary purpose of correlation filters is distortion-invariant recognition of objects in clutter. Traditionally, SDF filters have been designed by imposing linear constraints on the training images to yield a known value at a specific location in the correlation plane. However, such conditions do not explicitly control the filters' ability to generalize over the entire domain of the training images. Various filters exhibit different levels of distortion tolerance even with the same training set and constraints. Another reason to question the method of using hard constraints on the training images is that these conditions do not hold for the test images, and the outputs obtained from the filter in practice are almost certain to differ from the values specified during training. Based on these observations, the UCFs were designed in a major departure from conventional SDF filter design philosophy of which the MACE filter is a special case.

SUMMARY OF THE INVENTION

A method is described for tracking the position of a target in a sequence of image frames provided by a sensor, comprising a sequence of the following steps:

(i) receiving an initial image frame with a preliminary set of target position data indicating a preliminary target position in relation to the image frame;

(ii) processing the image frame with a distance classifier correlation filter (DCCF) to register a sub-frame patch of said image frame using said set of target position data, wherein the target is centered in relation to said sub-frame patch;

(iii) using said sub-frame patch to update a sub-frame filter used for searching a successive image frame for an updated location of said target in said successive image frame and providing an updated set of target position data;

(iv) processing the subsequent image frame with said DCCF to register a successive sub-frame patch of said successive image frame, wherein the target is centered in relation to said sub-frame patch using said updated set of target position data;

(v) testing the successive sub-frame patch to determine the goodness of match between the original sub-frame patch and said successive sub-frame patch, and repeating steps (iii) and (iv) if a good match is found;

(vi) if a good match is not found, performing an independent determination of the target position using a maximum average correlation height (MACH) filter, and using the MACH filter output to provide a fresh set of target position data; and (vii) using the fresh set of target position data, repeating steps (iii) and (iv).

BRIEF DESCRIPTION OF THE DRAWING

These and other features and advantages of the present invention will become more apparent from the following detailed description of an exemplary embodiment thereof, as illustrated in the accompanying drawings, in which:

FIG. 1 depicts a 3-class example where $m_1$, $m_2$ and $m_3$ represent the class centers, and z is the unknown input to be classified.

FIG. 2 is an algorithm flow diagram illustrative of the invention, used for testing the filters in a tracker environment.

FIG. 3 illustrates the DCCF shape matching processing used to register the sub-frame to the lock coordinates in accordance with the invention.

FIG. 4 shows the operation of processing scaled target images with a MACH filter in accordance with an aspect of the invention.

DETAILED DESCRIPTION OF THE PREFERRED EMBODIMENT

Figure 5:
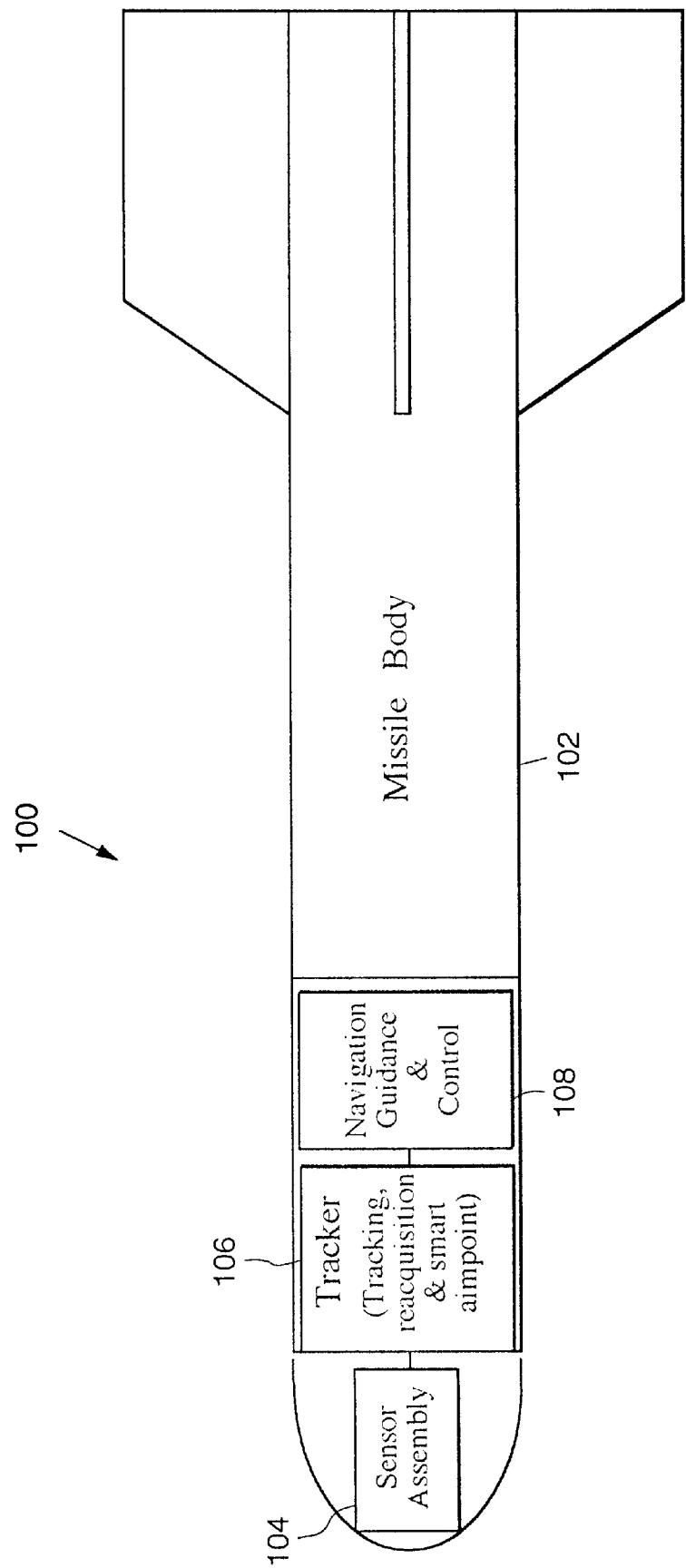
FIG. 5 is a simplified schematic block diagram of an airborne guided missile employing the invention.

An application of UCFs for target reacquisition and smart aim-point selection is described. In particular, the form used is a variant of the MACH (maximum average correlation height) filter (A. Mahalanobis et al., "Unconstrained correlation filters," Applied Optics, Vol. 33, pp. 371–3759 (1994) which has demonstrated significant promise for recognizing distorted views of an object in clutter.

The notation followed herein is as follows: images in the space domain are denoted in lower case italics while upper case italics are used to represent the same in the frequency domain. Thus, a two dimensional (2D) image x(m,n) has Fourier transform X(k,l). Vectors are represented by lower case bold characters while matrices are denoted by upper case bold characters. Either x(m,n) or X(k,l) can be expressed as a column vector x by lexicographical scanning. The superscript $^T$ denotes the transpose operation, and $^+$ denotes the complex conjugate transpose of vectors and matrices.

To understand the MACH filters' objective, consider the correlation surface $\bar{g}$ produced by the mean image m. If $\bar{g}$ exhibits a sharp well-defined peak, then a robust distortion tolerant filter should cause the rest of the class to also follow this behavior. This requirement can be formulated as a mean-square error criterion using Parseval's theorem as $$MSE = \sum_{i=1}^{N} |H^* x_i - H^* m|^2 \cong \sum_{i=1}^{N} |g_i - \bar{g}|^2 \quad (1)$$

where H is a diagonal matrix with the coefficients of the filter h as its diagonal elements, $x_i$ is the i-th training image, and $g_i$ is the corresponding correlation plane in the space domain. With some mathematical manipulations, this can be re-written as $$MSE = (1/N) \sum_{i=1}^{N} (X_i^* h - M^* h)^+ (X_i^* h - M^* h) \quad (2)$$

$$= h^* \left[ (1/N) \sum_{i=1}^{N} (X - M)^* (X - M) \right] h$$

$$= h * Sh = ASM$$

where $$S = (1/N) \sum_{i=1}^{N} (X - M)$$

is a diagonal matrix. The MSE criterion in Eq. (2) is referred to as the average similarity measure (ASM), and treated as a metric for distortion. The smaller the value of ASM, the more invariant the response of the filter will be. In other words, if ASM is small and $\bar{g}$ is well shaped, then all true-class correlation planes are expected to resemble $\bar{g}$ and to exhibit well-shaped structures. h is therefore required to have a high correlation peak with the mean image while making ASM small. In addition, some degree of noise tolerance is required to reduce the output noise variance (ONV). For additive input noise, it can be shown that ONV=h$^+$Ch where C is the noise covariance matrix. The performance criterion to optimize for the MACH filter is thus chosen to be $$J(h) = \frac{(\text{Peak Height})^2}{ASM + ONV} = \frac{|h^+ m|^2}{h^+ Sh + h^+ Ch} = \frac{h^+ m m^+ h}{h^+ (S + C) h} \quad (3)$$

The optimum solution is found by setting the derivative of $J(h)$ with respect of h to zero and is given by $$h = (S + C)^{-1} m \quad (4)$$

The filter in Eq. (4) is referred to as the maximum average correlation height (MACH) filter because it maximizes the height of the mean correlation peak relative to the expected distortions. In cases where an estimate of C is not available, the white noise covariance matrix, i.e., C=$\sigma^2$ I, is substituted and the simplified MACH filter becomes $$h = (S + \sigma^2 I)^{-1} m \quad (5)$$

To date, the MACH filter has demonstrated more robust performance than previous SDF filters. This is attributed to the inclusion of the ASM criterion which reduces the filters' sensitivity to distortions, and to the removal of hard constraints on the peak. The latter fact permits the correlation planes to adjust to whatever value best permits the optimization of performance criterion.

Post Processing. The approach for post processing the output of the MACH filter is now discussed. The primary purpose of the MACH filter is to detect the target and report its location. This can be done by establishing which points in the output plane are caused by background and which are in response to the targets. It is observed that in general the vast majority of points are due to the background and clutter. In fact, only that point which represents complete overlap between the target and the filter is minimally influenced by the neighboring background. The number of such points is very small since the expected number of targets is very few compared to clutter area (which determines the size of the image and the number of points in the correlation plane).

Assuming that background and clutter are random, values in the output correlation plane can be characterized by a probability distribution function (pdf). The pdf of the output correlation is likely to be gaussian due to the central limit theorem. Isolated points produced in response to the target are also assumed to be gaussian, but belong to a different distribution representative of the signal correlation. Therefore, peaks which exhibit a low probability of belonging to the background distribution can be treated as possible target detections. The procedure to estimate the probability for the background points is straightforward. The mean $\mu$ and standard deviation $\sigma$ over some window at location (m,n) are estimated, and the probability $$p_{m,n} = \left(1 / \sqrt{2\pi\sigma^2}\right) \exp\left[-\frac{(g(m,n) - u)^2}{2\sigma^2}\right], \quad (6)$$

is evaluated, where g(m,n) is the value at the point of interest in the correlation plate. If $P_{m,n}$ is a small number, then the pixel at location (m,n) is unlikely to belong to the background distribution, and is therefore potentially a target.

Equivalently, for potential targets (non-background) points, the correlation points to be out-liers relative to the background distribution and the argument of Eq. ( 6) are expected to be large, or $$N_{m,n}^2 = \left[\frac{g(m,n) - \mu}{\sigma}\right] \quad (7)$$

to be large. Therefore using square root of this metric (i.e., $N_{m,n}$) for target detection is reasonable from a probability standpoint, and is identical to the criterion found in the literature to estimate the goodness of the peak in terms of the number of standard deviations above the mean. This metric is referred to as the peak to side-lobe ratio (PSR), and is defined as $$PSR = N = \frac{\text{peak} - \mu}{\sigma} \quad (8)$$

The subscripts $_{m,n}$ are dropped for simplicity. While PSR criterion is not actually taken into consideration in the design of most correlation filters, it can be shown that the MACH filter is expected to yield large values of PSR under certain conditions, and therefore is an useful target detector.

Specifically, it can be shown that if the sample realizations of x are very similar to each other (as is the case when the training set is partitioned into clusters of similar images), $PSR^2$ can be approximated as $$PSR^2 = N^2 = E\left\{\frac{|x^+h|^2}{h^+(S+C)h}\right\} \approx \frac{|m^+h|^2}{h^+(S+C)h} \qquad (9)$$

This is of course identical to the criterion optimized by the MACH filter. Thus, the MACH filter should give near optimum results for target detection by identifying them to be sufficiently different from the background.

Distance Classifier Correlation Filters. The MACH filter is the first unconstrained filter to utilize the ASM as a criterion for improving distortion tolerance. However, the possibility of comparing the full shapes of the correlation planes for decision making is still not completely addressed by the MACH filter. The distance classifier correlation filter (DCCF) (A. Mahalanobis, B. V. K. Vijaya Kumar, and S. R. F. Sims, "Distance classifier correlation filters for multi-class automatic target recognition", *Applied Optics*, Vol. 35, No. 17, pp. 3127–3133, (1996)) was therefore developed to directly measure the similarity between the sculpted shapes of the correlation plane and the ideal shape for that class. The MACH filters are viewed more as detection filters while DCCFs are treated as classifiers.

For discussion purposes here, the terms "transformation" and "filtering" are interchangeable. The distance classifier transform H is designed to optimally separate the classes while making them as compact as possible (i.e. for each class, the correlation planes should be as similar as possible to the transformed ideal reference shape for that class). For shift-invariance, this transform must be diagonal in the frequency domain. Multiplication of x by a diagonal H is equivalent to multiplying X(k,l) by H(k,l) or a convolution/correlation in space domain which provides shift-invariance. The correlation plane may thus be referred to as a result of the transformation. FIG. 1 depicts a 3-class example where $m_1$, $m_2$ and $m_3$ represent the class centers, and z is the unknown input to be classified. The transformation by H is expected to make the classes distinct by moving their centers apart while shrinking the boundaries so that H*z can be easily identified with its correct class (class 3 in the figure since $d_3$ is the smallest distance). Thus, the distance comparisons are between the entire filtered image and filtered ideal reference, which is equivalent to using the information in the full correlation plane.

To make the "intra-class" separation between the correlation peaks very large, the mean peak values of the classes are made as different as possible. Towards this end, the criterion $$A(h) = \frac{1}{C}\sum_{k=1}^{C}|m^+_k h - m^+h|^2 = \frac{1}{C}\sum_{k=1}^{C}h^+(m-m_k)(m-m_k)^+h \qquad (10)$$

$$= h^+Th$$

is formulated, where $$T = \frac{1}{C}\sum_{k=1}^{C}(m-m_k)(m-m_k)^+$$

is a d×d full matrix of rank $\leq C-1$, and $m_k$ and m are the mean image of the k-th class and the overall mean of the entire training set, respectively. If A(h) in Eq. (10) is maximized, the class mean correlation peaks ($m_k^+h$) will differ greatly. The individual correlation peaks of the different classes will also become well separated provided ASM is simultaneously minimized. The objectives are therefore met by maximizing the ratio of A(h) and ASM, i.e.

$$J(h) = \frac{h^+Th}{h^+Sh} \qquad (11)$$

with respect to h. The optimum solution is the dominant eigenvector of $S^{-1}T$. The details for numerically obtaining this solution are in A. Mahalanobis, B. V. K. Vijaya Kumar, and S. R. F. Sims, "Distance classifier correlation filters for multi-class automatic target recognition", *Applied Optics*, Vol. 35, No. 17, pp. 3127–3133, (1996).

For testing purposes, the distance to be computed between the transformed input and the ideal shape for class k is $$d_k = |H^*z - H^*m_k|^2 = p + b_k - 2z^+h_k \quad 1 \leq k \leq C \qquad (12)$$

where z is the input image, $p=|H^*z|^2$ is the transformed input image energy, $b_k=|H^*m_k|^2$ is the energy of the transformed k-th class mean, and $$h_k = HH^*m_k \qquad (13)$$

is viewed as the effective filter for class k. Since there are only C classes to which distances must be computed, only C such filters. The constants $b_k$ do not depend on the input and can be pre-computed. Since p is independent of the class, it can be dropped if linear decision boundaries are sufficient. The third term in Eq. (12) is the only term that requires correlation. Essentially, the minimum value of $d_k$ over all possible shifts between the input and the reference is desired. Therefore, this term should be chosen as the maximum value in the cross-correlation of z and $h_k$. The decision strategy is to label the input as belonging to the class to which the distance is minimum.

Test results have showed that DCCFs outperform other correlation filters in recognizing targets while rejecting noise, clutter and other confusing objects.

Tracker Application. The exemplary tracker application of the invention described herein is to provide a reacquisition capability when break lock occurs. The ability to choose a smart aim-point in the terminal phase is a natural consequence of the filter's processing mechanism. While the technique described here is applicable for the lock-on-after-launch (LOAL) scenario, it is discussed in context of a lock-on-before-launch (LOBL) mode for the tracker. To illustrate the benefits of using correlation filters, it is assumed that a conventional mean absolute difference (MAD) correlation algorithm is used for nominal tracking capability. It should be noted that present trackers are far more sophisticated than the tracker assumed in this example.

The filters are expected to operate over a range of 10–80 pixels to the linear dimension of the target or to a maximum range of about 2 km. One main advantage of correlation filters is that they are synthesized from stored references that are not corrupted by clutter. The proper choice of training (reference) imagery is important for optimum performance. Possible sources of reference images include turntable data or computer generated models. Given the variations in IR signatures, the validation of training imagery deserves considerable attention. The filters are anticipated to work over a "nominal" range of signature variations with "tuning" required to cover broad range of thermal conditions. In addition to thermal variations, the filters' performance is a function of the number of pixels on targets and the input signal to noise ratio.

An algorithm flow diagram useful for target re-acquisition and aimpoint selection in a tracker environment in accordance with the invention is shown in FIG. 2. A rudimentary tracker is implemented using sub-frame processing as is explained next. The process 50 assumes that a track point is initialized by the user at the beginning of a sequence of images. At the start of iterations through the process, the DCCFs are used at step 52 to memorize the target's signature on the first frame. This stored target signature is used in a subsequent confidence match test 54, so that the current sub-frame target registration will be compared against the stored target registration from the first frame. For the first pass through the process of FIG. 2, the confidence match will reach a true decision, since the stored target registration is being compared against itself. The match test 54 employs a user-defined threshold to determine whether the result of the match is true or false.

If the result of the confidence match test 54 is true, a patch of image centered on the aimpoint is used to synthesize the sub-frame filter at step 56. A sub-frame patch (containing the target) of the present frame is selected to find the target in the next frame, i.e. to find the location of a peak in the second frame. Step 62 illustrates the next frame search using the sub-frame filter. This search provides the location and characteristics of a peak in the next image, which indicates the target position. At step 64, if the magnitude of the peak exceeds a user-defined threshold, it is assumed to be a good peak, and a true result is declared. A displacement check is performed at step 66 if a good peak has been found, and compares the displacement of the new peak/target to the stored location of the last peak/target to a user-defined threshold value. If the target position has moved a relatively large distance, this is taken as an indication that the new target position is not a good one.

If the results of the peak test and displacement test are true, operation now returns to the DCCF sub-frame target registration process at step 52. The DCCF shape matching processing 52 is used to register the sub-frame to the lock coordinates in the next frame. The results of sub-frame tracking are accepted at step 54 only if the similarity measure exceeds a preset threshold. This process is expected to track most frames, and operation will repeat through the updating of the sub-frame filter at step 56, and the search through the next frame at step 62. However, when the similarity measure criterion is not satisfied and the DCCF registration process fails, the MACH filters are used at step 58 to update the aim-point and re-designate the track-point. Once the MACH filters are invoked, the process re-initializes with the new lock coordinates as determined by the filters. The MACH filters have pre-stored images which are independent of target and scene data being processed by the system. The MACH filters provide an independent determination of the target position if successful, and this target position is used to then update the sub-frame filter at step 56, and a next frame target search is conducted at step 62 as before.

In the present case, the MACH filters are designed to recognize the target at full scale. This requires knowledge of range to target to scale a patch containing the target to match the resolution of the MACH filter. The scale does not have to be exact since the filters are tolerant to approximately 20% variation in size of the target. It should be noted that when range information is not available, the MACH filters can be designed at different resolutions to cover sufficient range. The trade is that it may be necessary to run more filters in the latter case.

In the event that the MACH filters are unable to successfully find the target position, as indicated by the results of the success test 60, then operation will return to the DCCF target registration process 52, which will not be updated with a new target position and sub-frame, and which will return operation to the MACH filters 58 through test 54. The MACH filters 58, the DCCF process 52 and the next frame target search process all have access to the new frame data, and so the MACH filter process 58 will re-assess the track-point in the next frame as it is available. The process will continue to loop through the MACH filtering process 58 in a coast mode until a target is successfully located in subsequent frames. Operation will then branch to step 56 to update the sub-frame filter, and use the new sub-frame filter to search the next image frame at step 62.

In the event that the peak or displacement tests return false results, operation branches to a multiple optical tracker (MOT) to await a new target position from an independent target tracking system not within the scope of this invention.

FIG. 3 shows DCCF sub-frame target registration process 52. An input frame 52A is transformed at 52B to provide a transform image patch. This patch is compared at 52C to an ideal transformed shape 52D of the locked patch, a distance calculation is performed, the target is registered, and a centered patch 52E results.

FIG. 4 shows the basic concept of operation of the MACH filter process 58. The subframe 58A contains target imagery and portions of a bright surface as nearby clutter. The MACH filter 58B yields a peak both in response to the target as well as the clutter. The PSR metric described above in regard to post-processing the filter output 58C is able to easily screen the clutter peak and select the correct peak to determine the location of the target.

FIG. 5 is a simplified schematic block diagram of an airborne guided missile employing the invention. The missile 100 includes a missile body 102, which houses the sensor assembly 104, the tracker 106 and the navigation guidance and control assembly 108. The sensor assembly provides a sequence of image frames of sensor data. The tracker 106 responds to the image frames and generates target position and track point signals which are employed by the navigation guidance and control assembly 108 in its function of guiding the missile. One function performed by the tracker is the algorithm described with reference to FIG. 2.

It is estimated that the sub-frame registration process can operate on 128×128 frames at about 30 Hz. The MACH filters are expected to run at about 10 Hz. However, the slower frame rate is not anticipated to be a problem if a conventional tracker is used to maintain general lock while the filters continue to verify the position of the target at a slower rate and provide the information as required.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A method for tracking the position of a target in a sequence of image frames provided by a sensor, comprising a sequence of the following steps:

(i) receiving an initial image frame with a preliminary set of target position data indicating a preliminary target position in relation to the image frame;

(ii) processing the image frame with a distance classifier correlation filter (DCCF) to register a sub-frame patch of said image frame using said set of target position data, wherein the target is centered in relation to said sub-frame patch;

(iii) using said sub-frame patch to update a sub-frame filter used for searching a successive image frame for an updated location of said target in said successive image frame and providing an updated set of target position data;

(iv) receiving a subsequent image frame and processing said subsequent image frame with said DCCF to register a successive sub-frame patch of said successive image frame, wherein the target is centered in relation to said successive sub-frame patch using said updated set of target position data; and (v) under a preselected set of conditions, performing an independent determination of the target position using a maximum average correlation height (MACH) filter to provide a fresh set of target position data.

2. The method of claim 1 wherein said preselected set of conditions includes the condition that the sub-frame patch registered by the DCCF for initial first image frame does not match with a sub-frame patch registered by the DCCF for a subsequent image frame using a similarity measure.

3. The method of claim 1 further comprising the step of testing said successive sub-frame patch of said successive image frame to determine a measure of the goodness of match between the sub-frame patch of said initial image frame and said successive sub-frame patch, repeating steps (iii) and (iv) if a good match according to said measure is found, and performing step (v) if a good match according to said measure is not found.

4. A method for tracking the position of a target in a sequence of image frames provided by a sensor, comprising a sequence of the following steps:

(i) receiving an initial image frame with a preliminary set of target position data indicating a preliminary target position in relation to the image frame;

(ii) processing the image frame with a distance classifier correlation filter (DCCF) to register a sub-frame patch of said image frame using said set of target position data, wherein the target is centered in relation to said sub-frame patch;

(iii) using said sub-frame patch to update a sub-frame filter used for searching a successive image frame for an updated location of said target in said successive image frame and providing an updated set of target position data;

(iv) processing the subsequent image frame with said DCCF to register a successive sub-frame patch of said successive image frame, wherein the target is centered in relation to said successive sub-frame patch using said updated set of target position data;

(v) testing successive sub-frame patch of said successive image frame to determine a measure of the goodness of match between the sub-frame patch of said initial image frame and said successive sub-frame patch, and repeating steps (iii) and (iv) if a good match according to said measure is found;

(vi) if a good match according to said measure is not found, performing an independent determination of the target position using a maximum average correlation height (MACH) filter to provide a fresh set of target position data; and (vii) using the fresh set of target position data, repeating steps (iii) and (iv).

5. An airborne missile, comprising:

a sensor assembly for providing a sequence of image frames;

a navigation guidance and control apparatus; and a tracker apparatus responsive to the sequence of image frames, said apparatus including apparatus responsive to the initial frame for providing a preliminary set of target position data indicating a preliminary target position in relation to the image frame, a distance classifier correlation filter (DCCF) to register a sub-frame patch of said image frame using said set of target position data, wherein the target is centered in relation to said sub-frame patch, apparatus using said sub-frame patch to update a sub-frame filter for searching a successive image frame for an updated location of said target in said successive image frame and providing an updated set of target position data, and apparatus for performing an independent determination of the target position under predetermined conditions, said apparatus comprising a maximum average correlation height (MACH) filter to provide a fresh set of target position data.

* * * * *